United States Patent
Nomura

[11] Patent Number: 5,673,207
[45] Date of Patent: Sep. 30, 1997

[54] METHOD FOR PROCESSING MOTION IMAGE TO DETERMINE OPTICAL FLOW AND SYSTEM FOR SAME

[75] Inventor: Masahide Nomura, Tokyo, Japan

[73] Assignee: NEC Corporation, Tokyo, Japan

[21] Appl. No.: 363,838

[22] Filed: Dec. 27, 1994

[30] Foreign Application Priority Data

Dec. 27, 1993 [JP] Japan .................................. 5-331477

[51] Int. Cl.[6] .................................................. G01S 17/50
[52] U.S. Cl. ........................ 364/516; 348/700; 348/701
[58] Field of Search .................................. 348/607, 669, 348/700, 701; 364/516; 382/260

[56] References Cited

U.S. PATENT DOCUMENTS

| | | | |
|---|---|---|---|
| 4,694,342 | 9/1987 | Klees | 348/607 X |
| 5,353,118 | 10/1994 | Cho | 348/451 |
| 5,373,329 | 12/1994 | Niitsu | 348/669 |

OTHER PUBLICATIONS

Horn Robot Vision "Motion Field & Optical Flow" Chapter 12 (1986 MI Press) ISO–262–08159 pp. 278–298.

Primary Examiner—Edward R. Cosimano
Attorney, Agent, or Firm—Foley & Lardner

[57] ABSTRACT

An image processing method for processing a sequence of motion images in the form of brightness patterns and picked up by a camera. The brightness patterns are applied to a spatiotemporal filtering differentiator having a plurality of initial phases thereof different from each other to obtain a set of local differential values grouped by the initial phases. The differential values are calculated to obtain a set of local brightness gradients.

21 Claims, 2 Drawing Sheets

1

METHOD FOR PROCESSING MOTION IMAGE TO DETERMINE OPTICAL FLOW AND SYSTEM FOR SAME

BACKGROUND OF THE INVENTION

The present invention relates to a motion image processing method and a motion image processing system, and particularly to a method for processing a motion image with a varying brightness pattern to determine an optical flow thereof as well as a system for the same.

DESCRIPTION OF THE RELATED ART

Every object has a brightness pattern in the image. The brightness pattern in a motion image moves as the object moves. The term "optical flow" means the movement of the brightness pattern in the motion image.

A well-known gradient method has been employed in the art as a measure to determine an optical flow in a natural motion image.

The gradient method advantageously permits a minute optical flow to be determined even in an image region without any significant points, (Robot Vision) Horn (1986, MI Press) ISO-262-08159.

The method however reveals a drawback in an image region with a violent variation in the brightness gradient, such that an increased error constitutes the difficulty in determining an optical flow.

Also available in the art is a dual eye system disclosed in the Japanese Patent Application No. 5-172801 to determine an optical flow from a pair of images at different of times.

The dual eye system permits a pair of images to be selected from among sequentially input motion images to calculate an optical flow.

In the system, however, selectable images are limited in number to avoid undesirable noise intervening therebetween that otherwise would adversely affect the result of calculation, rendering it impractical.

SUMMARY OF THE INVENTION

The present invention has been achieved with such points in mind.

It is therefore an object of the present invention to provide a method as well as a system for processing a series of sequentially input motion images to determine an optical flow therein, permitting a practical result to be obtained without significant influences due to intervening noise between images, even in the case when a violent variation is observed of brightness gradient in the motion images.

To achieve the object, a genus of the present invention provides a method for processing a sequence of motion images input in the form of brightness patterns. It comprises two steps. A first step applies the brightness patterns to a spatiotemporal filtering differentiator means that has a plurality of initial phases thereof different from each other, to thereby obtain a set of local differential values to be grouped by the initial phases. In a second step, the differential values are calculated to obtain a set of local brightness gradients.

According to the genus of the invention, a spatiotemporal filtering differentiator means removes undesirable noise of brightness patterns and differentiates them, giving a set of differential values that are inherently local due to the differentiation. Violent variations, if any in the brightness patterns, are made discrete by using different initial phases. The differential values obtained are calculatable to obtain a

2 set of local brightness gradients in a variety of manners. Any gradient is a combination of local differential values.

According to a species of the genus of the invention, the brightness patterns comprise a sequence of planer patterns, and the initial phases are two in number and different from each other substantially by $\pi/2$ radians.

According to another species of the genus of the invention, the brightness patterns consist of a set of geometric real local areas and a set of local measures of brightness respectively associated with the real local areas.

And, the applying step comprises two steps. A first step consists of a pair of steps. Either step is composed of the substeps of spatiotemporally filtering the real local areas to obtain a set of first local contrasty areas, and executing a first convolution of the local measures to the first contrasty areas to obtain a set of local brightness values. The other step is composed of two substeps. A first substep spaticily filters the real local areas to obtain a set of second local contrasty areas, while executing a temporal difference calculation of the second contrasty areas to obtain a set of local area differences. A second substep executes a second convolution of the local measures to the local area differences to thereby obtain a set of local brightness differences. In a second step, the local brightness differences are divided by the local brightness values, respectively, to obtain the local differential values.

According to an individual species of the invention, the spatiotemporally filtering substep comprises processing a set of spatiotemporal coordinates of the real local areas, through a multi-variable Gabor function, to obtain the first local contrasty areas in the form of a set of spatiotemporally anisotropic spatiotemporal coordinates.

According to another individual of this species of the invention, the second substep comprises processing a set of spatiotemporal coordinates of the real local areas, through a combination of a multi-variable Gabor function and a temporal-difference calculating operator, to obtain the local area differences in the form of a set of spatially anisotropic spatiotemporal coordinates.

According to another species of the genus of the invention, the calculating step comprises the steps of collecting the local differential values by the initial phases to obtain a set of combined local differential values, and analysing the combined local differential values to obtain the local brightness gradients.

According to another species of the genus of the invention, the calculating step includes rendering larger relatively large ones of the local differential values and smaller relatively small ones thereof.

According to another species of the genus of the invention, the calculating step includes providing larger ones of the local differential values than a predetermined value with a tendency to approach a relatively high value and smaller ones thereof than a predetermined value with a tendency to approach a relatively small value.

According to another species of the genus of the invention, the calculating step includes selecting relatively small ones from the local differential values.

According to another species of the genus of the invention, the calculating step includes selecting relatively large ones from the local differential values.

Moreover, to achieve the object, another genus of the present invention provides a system for processing a sequence of motion images in the form of brightness patterns. It comprises a spatiotemporal filtering differentiator means and a calculating means. The filtering differentiator means filters and differentiates the brightness patterns; it has a plurality of initial phases different from each other for obtaining a set of local differential values grouped by the initial phases. The calculating means serves for calculating the differential values to obtain a set of local brightness gradients.

According to a species of this genus of the invention, the brightness patterns consist of a set of geometric real local areas and a set of local measures of brightness respectively associated with the real local areas. And the spatiotemporal filtering differentiator means comprises a spatiotemporal filter means, a first convolution means, a spatially filtering calculation means, a second convolution means, and a divider means. The spatiotemporal filter means spatiotemporally filters the real local areas to obtain a set of first local contrasty areas. The first convolution means is for executing a first convolution of the local measures to the first contrasty areas, to obtain a set of local brightness values. The spatially filtering calculation means serves for spatially filtering the real local areas, to obtain a set of second local contrasty areas and for executing a temporal difference calculation of the second contrasty areas, to obtain a set of local area differences. The second convolution means is for executing a second convolution of the local measures to the local area differences, to obtain a set of local brightness differences. The divider means divides the local brightness differences by the local brightness values, respectively, to obtain the local differential values.

According to an individual species of the invention, the spatiotemporal filter means comprises a multi-variable Gabor function means for processing therethrough a set of spatiotemporal coordinates of the real local areas to obtain the first local contrasty areas in the form of a set of spatiotemporally anisotropic spatiotemporal coordinates.

According to another individual species of the invention, the spatially filtering calculation means comprises a multi-variable Gabor function means and a temporal-difference calculating operator means cooperating with each other to process therethrough a set of time-spatial coordinates of the real local areas to obtain the local area differences in the form of a set of spatially anisotropic spatiotemporal coordinates.

According to another species of this genus of the invention, the calculating means comprises a collector means for collecting the local differential values by the initial phases to obtain a set of combined local differential values, and an analysis means for analysing the combined local differential values to obtain the local brightness gradients.

According to another species of this genus of the invention, the calculating means is provided with a means for rendering larger relatively large ones of the local differential values and smaller relatively small ones thereof.

According to another species of this genus of the invention, the calculating means is provided with a means for providing larger ones of the local differential values than a predetermined value with a tendency to approach a relatively high value and smaller ones thereof than a predetermined value with a tendency to approach a relatively small value.

According to another species of this genus of the invention, the calculating means is provided with a means for selecting relatively small ones from the local differential values.

According to another species of this genus of the invention, the calculating means is provided with a means for selecting relatively large ones from the local differential values.

BRIEF DESCRIPTION OF THE DRAWINGS

The objects, features and advantages of the present invention will become more apparent from consideration of the following detailed description, taken in conjunction with the accompanying drawings, in which.

DESCRIPTION OF THE PREFERRED EMBODIMENTS

There will be detailed below preferred embodiments of the present invention, with reference to FIGS. 1 and 2.

Figure 1:
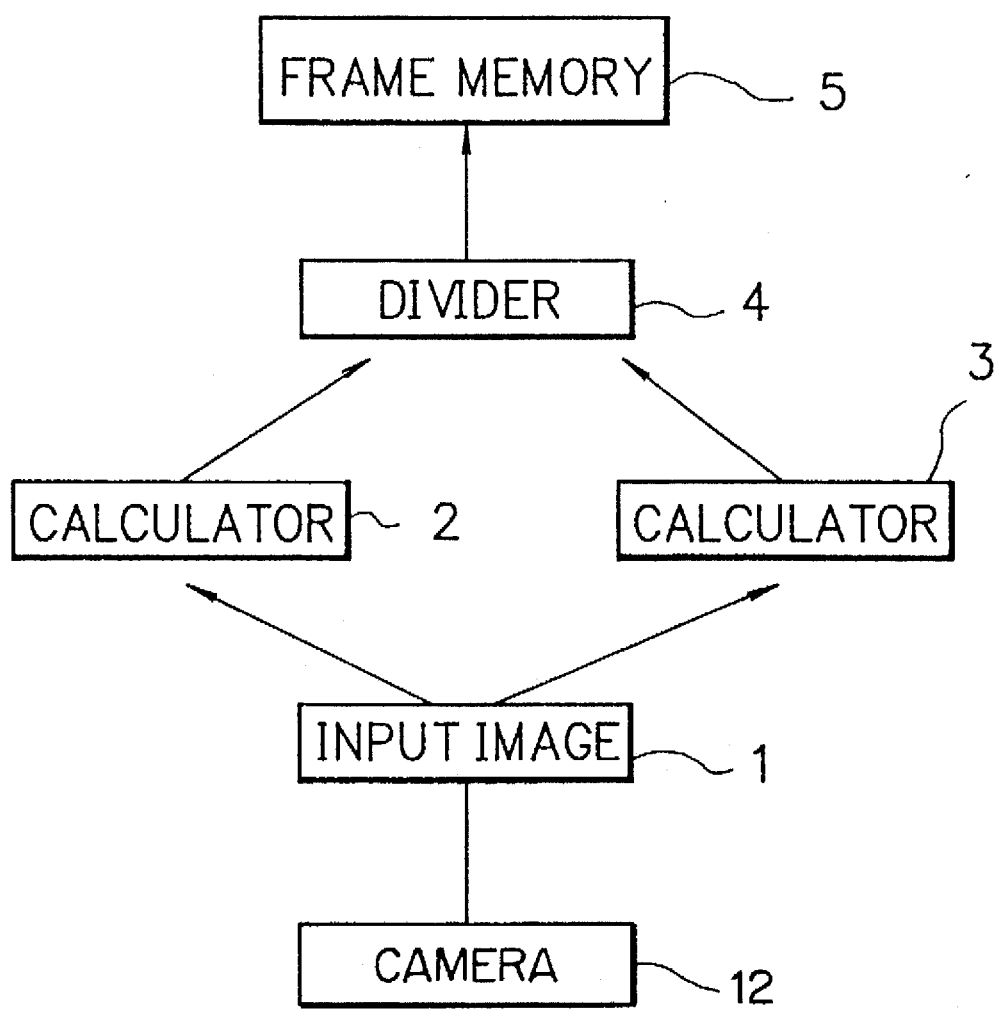
FIG. 1 is a block diagram of an essential part of a processing system according to a first embodiment of the invention.

FIG. 1 shows an essential part of a motion image processing system according to a first embodiment of the invention. The system of FIG. 1 comprises a memory block 1 for storing a sequence of motion images input from an image picking up camera 12, a calculator 2 including a spatiotemporal anisotropic filter employed in a noise removal process for determining a set of local brightness values or gradient data from the input sequence of motion images, a calculator 3 including a spatial anisotropic filter combined with a temporal differentiator, a divider 4 for determining a set of brightness differential values, and a frame memory 5 for storing the brightness differential values or brightness gradient data employable to determine an optical flow in the form of a spatiotemporal streamline. The system further comprises an unshown known calculator for determining a brightness gradient at an arbitrary spatiotemporal area.

As shown in FIG. 1, datastreams run from the input image storing block 1 to the calculators 2, 3; from these calculators 2, 3 to the divider 4; from the divider 4 to the frame memory 5; and from the memory 5 to the unshown calculator.

The block 1 is adapted as a spatiotemporal memory for storing a temporal sequence of motion images each composed of an original brightness pattern consisting of a set of matrix-addressed geometric real local areas each defined in a two-dimensional real space in a spatiotemporal frame having a real time axis, a set of local measures of brightness each associated with a corresponding one of the real local areas and a set of undesirable or intervening noise components each associated with a corresponding one of the real local areas. The system determines an optical flow in terms of a brightness gradient at any spatiotemporal local region in the spatiotemporal frame.

Each local measure "a" of brightness is represented in the form of a formula such that:

$$a = a(x, y, t) \qquad (1)$$

where, denoted by character x is a row of an area matrix or an abscissa in the real space, y is a column of the matrix or an ordinate in the real space, and t is a real time. The characters x, y, t are thus cooperative with each other as parameters to define a spatiotemporal address of a geometric real local area carrying the measure of brightness, and will be employed as geometric variables in an associated spatiotemporal frame.

The calculator 2 comprises a digital circuit for executing calculations of a Gabor function for an anisotropic removal of noises, and a well-known convolution by integration for giving an appropriate gain to each dependent variable of the Gabor function.

The Gabor function conceptually is a multi-parametered calculator in an imaginary field such as a complex vector field, a frequency space or a Fourier space. It generally appears in the form of a combination of a phase-variable radius vector in a multi-dimensional frequency space and a Gaussian as a variable multiplication factor thereof. The radius vector extends in a length-variable manner from an origin of the frequency space, rotating therearound with a varying phase, anytime pointing a spatial point representative of a spatial frequency which has its projection on any axis or reference surface in the space. This projection is an output of the Gabor function that can be determined by a number of parameters, as they are valued.

Some of the parameters may be common to both a determining function of the phase and the Gaussian, and others may not, as the Gabor function may be modified to be employed in a variety of multi-dimensional spaces. Any parameter may be a constant, and any may be a variable. With some of the given parameters fixed, the others produce a set of points lying on an inherently anisotropic trace, as they vary, around a central frequency representative of a principal axis of an associated anisotropic field.

This anisotropism serves to give a contrasty image, when an original geometric pattern of a given image is input in the form a set of combinations of segment parameters of the latter. The contrasting property effectively works to remove an undesirable noise component in the given image.

In the calculator 2, the Gabor function appears as a six-parametered multi-variable function G such that:

$$G = G(x, y, t, k_i, \theta j, \emptyset) \quad (2)$$

where, denoted by character $k_i$ is an indexed one of valued-parameters to represent a central spatial frequency (index i=an arbitrary integer between 1 to $n_k$, both inclusive, while i will be fixed to a single appropriate value in a summing step of the present embodiement for brevity), $\theta j$ is an indexed one of valued-parameters to represent the orientation of a principal axis in an associated anisotropic field (index j=an arbitrary integer between 1 to $n_1$, both inclusive). and $\emptyset$ is $\emptyset_p$ as an indexed one of valued-parameters to represent an initial phase to be 0 or $\pi/2$ radians in the present embodiment (index p=an arbitrary integer between 1 to $n_m$, both inclusive, such that $\emptyset_1=0$ and $\emptyset_2=\pi/2$).

The Gabor function may thus have a number of combinations of available values of the valued-paramters $k_i$, $\theta j$, $\emptyset$, such that: $n_m \times n_k \times n_1$. This equals to $2 \times n_k \times n_1 = 2 \times 1 \times n_1 = 2n_1$ in the present embodiment. In a real-part calculating field of the calculator 2, therefore, a corresponding number of Gabor functions $G_{i,j,p}$ are provided, such that:

$$\begin{aligned} G_{i,j,p} &= G(x, y, t, k_i, \theta j, \phi_p) \quad (3) \\ &= G(x, y, t, k_i, \theta j, \phi) \\ &= \sin[2\pi k_i \{(x \cos \theta j + y \sin \theta j) \cos \theta j + t \sin \theta j\} + \phi] \times \\ & \quad \exp\{-2k_i^2 (x^2 + y^2 + t^2)\} \end{aligned}$$

In this respect, as well known, a generalized spatiotemporal Gabor function has a form such that:

$$G(x, y, t, k, \sigma, \theta, \phi) = \sin[2\pi k\{(x \cos \theta + y \sin \theta) \cos \theta + t \sin \theta\} + \phi] \times \exp\{-(x^2 + y^2 + t^2)/2\sigma^2\}$$

where, x, y, t, k, θ and ∅ are corresponding parameters to x, y, t, $k_i$, $\theta j$ and $\emptyset_p$ of the Gabor functions $G_{i,j,p}$, respectively, and σ is a control parameter of a window size of the Gaussian (i.e. the exponential factor). The Gaussian has an increasing value toward a unity as the parameter a increases, and a decreasing value toward a null as it decreases. On the other hand, the trigonometric factor (i.e. the sine function factor) has a longer period (exhibiting a spatiotemporally moderated variation) with the parameter k increased, and a shorter period (exhibiting a spatiotemporally sharpened variation) with the parameter k decreased.

It will be understood that the Gabor functions $G_{i,j,p}$ are all constrained such that $2k\sigma=1$, thereby holding an adapted relationship between the window size and the spatiotemporal variation of mapping to have a controlled anisotropism for an optimal contrast and data processing.

The Gabor functions $G_{i,j,p}$ respectively serve as a noise-eliminating anisotropic spatiotemporal filter means. Accordingly, the expression (3) describes that the calculator 2 removes an associated noise component of each geometric real local area (x, y; $t_{current}$) of any current motion image in the temporal sequence, by filtering the real local area through a plurality of anisotropic spatiotemporal filter means $G_{i,j,p}$ having their parameter value combinations ($k_i$, $\theta j$, $\emptyset$) with respect to repective employed values $k_i$, $\theta j$, $\emptyset$ of a number $n_m \times n_k \times n_1$, of filtering parameters including an initial phase shifting parameter $\emptyset$, thereby obtaining for the real local area (x, y; $t_{current}$) a plurality of contrasty local areas $\{G_{i,j,p}\}$ each identifiable by the parameter value combination of a corresponding spatiotemporal filter means.

The phase shifting parameter $\emptyset$ preferably has a value equal to or in the vicinity of 0 radian and likewise to or of $\pi/2$ radians, i.e. 90 degrees, in the present embodiment. It will be understood that the value $\pi/2$ implies any or some of $\pm\pi/2+2n\pi$ (n=arbitrary integer including a null, a positive one and a negative one) and further it may preferably be set to any or sequence of $\pi/2$, $\pi/3$, $\pi/4$, ..., $\pi/n$ or m $\pi/2$, m$\pi/3$, m$\pi/4$, ..., m$\pi/n$ (m=arbitrary integer), as necessary for an adaptive phase shift in accordance with the type or volume of the data to be processed. The employed $\pi/2$ permits an operation with a saved storage and an effective noise elimination, in addition to that a resulted pair of filter groups (either to 0 radian and the other to $\pi/2$ radians) are sufficient and empirically best for a practical purpose.

The convolution (generally represented by * or **) in the calculator 2 gives a plurality of outputs $g_{i,j,p}$, such that:

$$\begin{aligned} g_{i,j,p} &= g(x, y, t, k_i, \theta j, \phi_p) \quad (4) \\ &= g(x, y, t, k_i, \theta j, \phi) \\ &= a(x, y, t) ** G(x, y, t, k_i, \theta j, \phi) \end{aligned}$$

where, $i=1 \sim n_k$ and $j=1 \sim n_1$, as described.

It also will be seen from the expression (4) that the calculator 2 executes a convolution g of an associated local measure a(x, y, $t_{current}$) of brightness of the real local area (x, y; $t_{current}$) to the respective contrasty local areas, thereby obtaining a plurality of identifiable local values $\{g_{i,j,p}\}$ of brightness.

The calculator 3 comprises a digital circuit for executing calculations of a Gabor function for an anisotropic removal of noise, a difference calculus for determining a temporal geometric difference, and a convolution by integration for giving an appropriate gain to the geometric difference to determine a temporal brightness difference.

In the calculator 3, the Gabor function appears as a five-parametered anisotropic spatial filtering function $G_s$ such that:

$$G_s = G_s(x, y, k_i, \theta j, \phi_p) \quad (5)$$
$$= G_s(x, y, k_i, \theta j, \phi)$$
$$= \sin\{2\pi k_i (x \cos \theta j + y \sin \theta j) + \phi\} \times$$
$$\exp\{-2k_i^2 (x^2 + y^2)\}$$

In this respect, as is well known, a generalized spatial Gabor function has a form such that:

$$G(x, y, k, \sigma, \theta, \phi) = \sin\{2\pi k (x \cos \theta + y \sin \theta) + \phi\} \times$$
$$\exp\{-(x^2 + y^2)/2\sigma^2\}$$

where, x, y, k, σ, θ and Ø are same as those of the generalized spatiotemporal Gabor function.

It therefore will be understood that the Gabor functions $G_s$ also is constrained such that $2k\sigma=1$, thereby holding an adapted relationship between the window size and a spatial variation of mapping.

The function $G_s$ cooperates with a temporal differentiator $D_s(t,k_i)=t \exp(-2 k_i^2 t^2)$ to constitute a temporal smoothing differentiator D, such that:

$$D = G_s(x, y, k_i, \theta j, \phi) \times D_s(t, k_i) \quad (6)$$
$$= D(x, y, t, k_i, \theta j, \phi)$$

where, variables x, y, t, parameters $k_i$, θj, Ø and their indexed values are same as those of the calculator 2.

Smoothing differentiator D also may thus have a number of combinations of available values of the valued-paramters $k_i$, θj, Ø, such that:

$$n_m \times n_k \times n_l$$

$$=2 \times n_k \times n_l = 2n_l.$$

In a real-part calculating field of the calculator 3, a corresponding number of smoothing differentiators $D_{i, j, p}$ are provided, such that:

$$D_{i,j,p} = D(x, y, t, k_i, \theta j, \phi_p) \quad (7)$$
$$= D(x, y, t, k_i, \theta j, \phi)$$
$$= \sin\{2\pi k_i (x \cos \theta j + y \sin \theta j) + \phi\} \times$$
$$t \exp\{-2k_i^2 (x^2 + y^2 + t^2)\}.$$

The expressions (5) to (7) describe that the calculator 3 removes an associated noise component of the real local area (x, y; $t_{current}$) of the current image, by filtering the real local area through a plurality of anisotropic spatial filter means $G_s$ having their parameter value combinations ($k_i$, θj, Ø) one-to-one correspondent to those of the spatiotemporal filter means $G_{i, j, p}$, thereby obtaining a plurality of contrasty geometric local areas $\{G_s\}$ each identifiable by the value setting of a corresponding spatial filter means $G_s$, while determining for the respective contrasty local areas $\{G_s\}$ a difference $D_s$ between each thereof and a corresponding contrasty local area of a neighboring motion image (x, y; $t_{precedent}$) in the temporal sequence, thereby obtaining a plurality of geometric local differences $\{D_{i, j, p}\}$.

The convolution in the calculator 3 also gives a plurality of outputs $d_{i, j, p}$, such that:

$$d_{i,j,p} = d(x, y, t, k_i, \theta j, \phi_p) \quad (8)$$
$$= d(x, y, t, k_i, \theta j, \phi)$$
$$= a(x, y, t) ** D(x, y, t, k_i, \theta j, \phi)$$

where, i=1~$n_k$ and j=1~$n_l$, as described.

It will be seen from the expression (8) such that the calculator 3 executes a convolution d of an associated local measure a(x, y, $t_{current}$) of brightness of the real local area (x, y; $t_{current}$) to the respective geometric local differences $\{D_{i, j, p}\}$, thereby obtaining a plurality of identifiable local difference values $\{d_{i, j, p}\}$ of brightness.

The divider 4 receives the local values $\{g_{i, j, p}\}$ of brightness from the calculator 2 and local difference values $\{d_{i, j, p}\}$ of brightness from the calculator 3.

Then, it determines for the respective local difference values $\{d_{i, j, p}\}$ a ratio of each thereof to a corresponding one of the local brightness values $\{g_{i, j, p}\}$, thereby obtaining for each employed value (0, π/2) of the phase shifting parameter Ø a plurality of local brightness differential values d/g, and further for a total number (2 in this case) of employed values of the phase shifting parameter Ø a total sum Σ [d/g] of the local brightness differential values d/g, thereby obtaining for each value of another filtering parameter θ, a plurality of local brightness differential values {V}, such that:

$$V(x, y, t, k_i, \theta j) = \sum_\phi [d(x, y, t, k_i, \theta j, \phi)/g\{(x, y, t, k_i, \theta j, \phi) + \epsilon\}] \quad (9)$$

where, ε is an anti-divergence parameter having an adaptively selectable positive minute value not exceeding a limit that depends on the number of significant digits in a practical system.

Without the parameter ε, the differential value V as the total sum Σ of d/g would have a divergent tendency at a particular local area of the current image, where the brightness value g may be quite small in comparison with the brightness difference value d, such as in a sudden appearance of a shadow or when a uniform brightness extends over a relatively large region in comparison with a window size in terms of $1/k_i$ of an associated Gabor function.

In a modified example, the divider 4 may be provided with an additional calculator to determine for a total number ($n_l$) of employed values of the anisotropism parameter $\theta_j$ a number of simple or adaptively weighted total sums of the local brightness differential values {V}, thereby obtaining for each value of the central frequency parameter $k_i$ a plurality of combinations of local brightness differential values {X}. The additional calculator may be connected to the frame memory 5.

Moreover, in the modified example, the additional calculator may have an additional function to determine for a total number ($n_k$) of employed values of the central frequency or channel parameter $k_i$ a simple, adaptively weighted or vector-componentwise sum of the local brightness differential values {X}, thereby obtaining for each local area (x, y; $t_{current}$) of the current image a local brightness gradient Y.

The results of calculation at the divider 4 are all stored in the spatiotemporal frame memory 5.

It will be understood that the anisotropic filters described have their filtering frequency bands, limitting their outputs within the bands.

It will also be seen that the calculator 2 serves as a plurality of spatiotemporal (i.e. frequency-spatial) filter means different of an initial phase from each other, the calculator 3 serves as a plurality of spatiotemporal difference-calculating filter means different of the initial phase from each other, and the divider 4 serves as a combination of a plurality of spatiotemporal divider means different of the initial phase from each other and a plurality of data collecting channel means, and that the difference-calculating filter means cooperate with the divider means to constitute a plurality of spatiotemporal differentiator means.

Accordingly, the calculators 2, 3 and the divider 4 cooperate with each other to constitute a combination of a plurality of spatiotemporal filtering differentiator means different of the initial phase from each other and a data collector means.

The spatiotemporal filtering differentiator means of FIG. 1 are arranged in three blocks for the convenience of description, while they may be collected in a single block or additionally subdivided. Essential is their combination to provide an adapted subchannels to process a sequence of motion images in a digitally computing manner.

It will be seen that the first embodiment is provided to process a temporal sequence of two-dimensional or planer patterns (x, y; t). However, the described concept is directly applicable to a temporal sequence of three-dimensional or solid patterns (x, y, z; t), (r, θ, z; t) or (r, θ, ∅; t), because any data in a digital field is definite in number and can be mapped on an arbitrary single line or plane.

Can also be seen that the foregoing discussions are intentionally given there, i.e. after basic description of the first embodiment, to support comprehension. They may be placed at a starting or ending paragraphs hereof and naturally applicable to other embodiments or modifications of the present invention.

Figure 2:
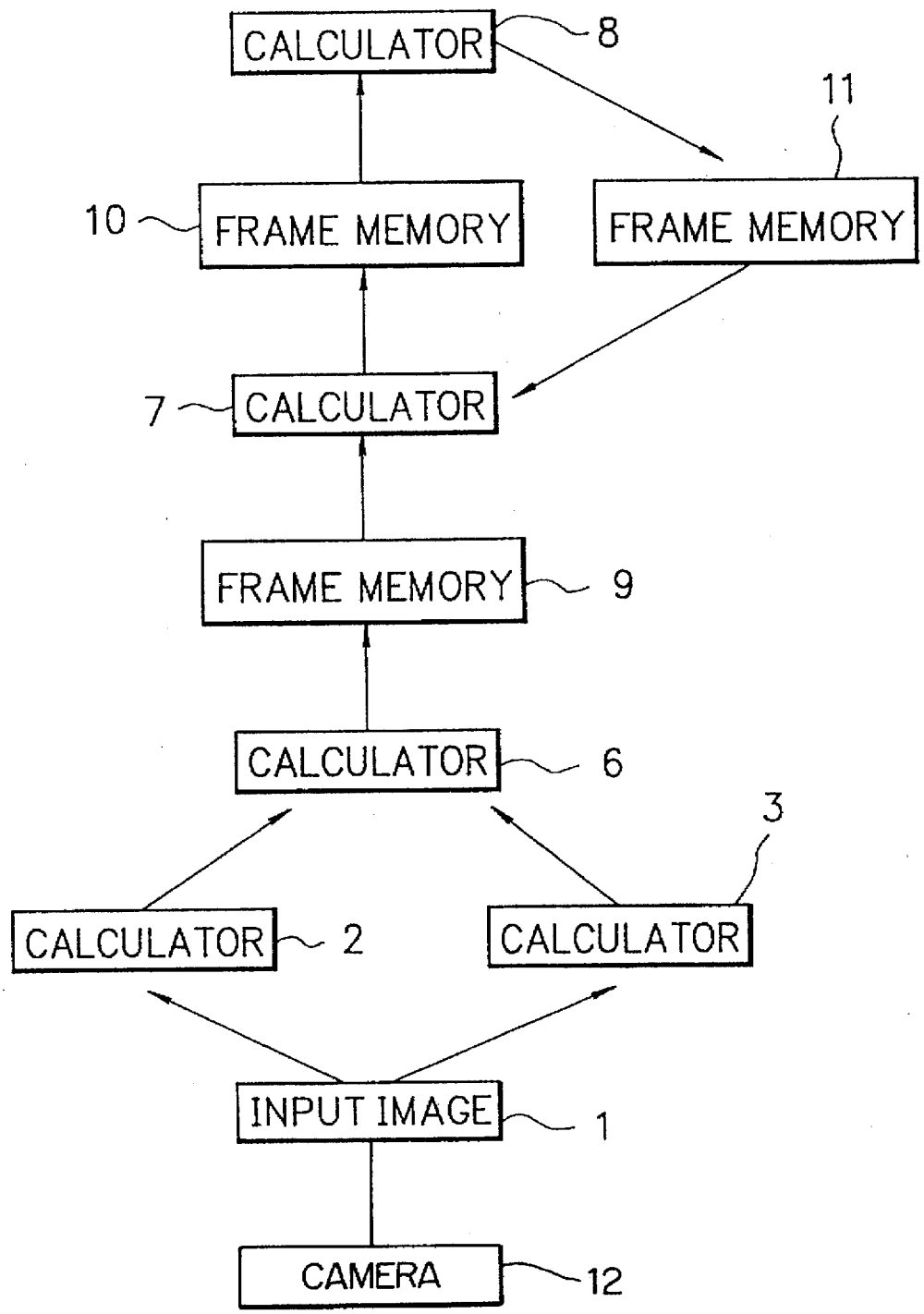
FIG. 2 is a block diagram of an essential part of a processing system according to a second embodiment of the invention.

FIG. 2 shows an essential part of a motion image processing system according to a second embodiment of the invention. Like members in the first embodiment are designated at like characters.

The system of FIG. 2 comprises a memory block 1 for storing a sequence of motion images input from an image picking up camera 12, a calculator 2 including a spatiotemporal anisotropic filter employed in a noise removal process for determining a set of local brightness values or gradient data from the input sequence of motion images, a calculator 3 including a spatial anisotropic filter combined with a temporal differentiator, and a sequential combination of calculators 6, 7 and 8 and frame memories 9 and 10, and a feeding back frame memory 11. The block 1 as well as the motion images stored therein and the calculators 2 and 3 are same as those described.

As shown in FIG. 2, datastreams run from the input image storing block 1 to the calculators 2, 3; from these calculators 2, 3 to the calculator 6; from this calculator 6 to the frame memory 9; from this memory 9 to the calculator 7; from this calculator 7 to the frame memory 10; from this memory 10 to the calculator 8; from this calculator 8 to the frame memory 11; and from this memory 11 to the calculator 7. Therefore, a feedback loop is constituted by the calculator 7, the memory 10, the calculator 8 and the memory 11.

The calculator 6 receives the local brightness values g as an output from the calculator 2 and the local brightness difference values d as an output from the calculator 3, and processes them by an incorporated image contrasting operator T, which emphasizes those areas relatively strong of an optical flow, such that:

$$T(x, y, t, k_i, \theta j) = \left| \sum_\phi [d(x, y, t, k_i, \theta j, \phi) - g(x, y, t, k_i, \theta j, \phi)] \right| \quad (10)$$

Resulted data T (x, y, t, $k_i$, θj) from the operation T are stored in the frame memory 9.

The calculator 7 receives the data T (x, y, t, $k_i$, θj) of a current motion image from the memory 9, and fed back weighted data $T_2$ (x, y, t–1, $k_i$, θj) of a precedent motion image from the memory 11, and processes them to update the weighted data $T_2$, such that:

$$T_2(x, y, t, k_i, \theta j) = b_j W(x, y, t) ** T(x, y, t, k_i, \theta j) + \\ (1 - b_j) T_2(x, y, t - 1, k_i, \theta j) \quad (11)$$

where, $b_j$ is a feedback factor as a control parameter to be set between 0.1 to 0.8, and W (x, y, t) is a weighting factor for a local smoothing.

The weighting factor may preferably be determined such that:

$$W(x, y, t) = exp\{-(x^2+y^2+t^2)/2\lambda^2\} \quad (12)$$

where, λ is a control parameter to control the degree of the local smoothing.

It will understood that actual calculations for any convolution follow an adapted algorithm to an employed calculator.

Resulted data $T_2$ (x, y, t, $k_i$, θj) from the operation of the calculator 7 are stored in the frame memory 10.

The calculator 8 employs the stored data $T_2$ (x, y, t, $k_i$, θj) in the memory 10, to determine a set of prominence values Q by processing them, such that:

$$Q(x, y, t, k_i, \theta j) = F\{T_2(x, y, t, k_i, \theta j)\} \quad (13)$$

where, $$F\{x\} = \{1 + tanh(x/\tau)\}/2 \quad (14)$$

where, τ is a constant to be set substantially between 0.01 to 0.1.

The prominence value Q is transferred to the frame memory 11. This value Q tends to have a positive value at a local area having a prominent optical flow. More specifically, the value Q tends to go near 1 when the optical flow in terms of brightness differential is larger than $1/k_i$ and near 0 when it is smaller than $1/k_i$, i.e., Q tends to approach a bi-level signal. This tendency is increased as the constant τ becomes smaller, and decreased as it becomes larger.

It will be seen that the value Q represents an emphasized tendency a temporal local brightness value has to change. In other words, it substitutes for a contrasty local brightness gradient or contrasty optical flow, so that it can serve as an advantageous implement to voluntarily create given set of local brightness data.

Moreover, it will also be seen that the valued data d and g may appear in the form of d (x, y, t, $k_i$) and g (x, y, t, $k_i$) and hence the valued data T (x, y, t, $k_i$, θj), $T_2$ (x, y, t, $k_i$, θj) and Q (x, y, t, $k_i$, θj) may be given in the form of T (x, y, t, $k_i$), $T_2$ (x, y, t, $k_i$) and Q (x, y, t, $k_i$), respectively.

The data Q (x, y, t, $k_i$, θj) or Q (x, y, t, $k_i$) may be utilized to obtain a sequence of motion images (x, y, t) having respective low optical-flow areas thereof eliminated by applying an elimination operator R, such that:

$$R(x, y, t, k_i) = a(x, y, t) \times \prod_j \{1 - Q(x, y, t, k_i, \theta j)\} \quad (15)$$

or $$R(x, y, t) = a(x, y, t) \times \prod_i \{1 - Q(x, y, t, k_i)\} \quad (16)$$

A reverse operation will permit an intended selection of the low optical-flow areas. This is permitted by simply using a pair of calculators 2, 3 having band-limiting filters, before processing the resulted value data.

It will be seen that in the case $n_k \geq 2$, each local area is processed by channels of associated spatial frequency, i.e. for each indexed value $n_k$, permitting a number of sub-areas to be separately processed in accordance with the magnitude of an optical flow.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. An image processing method in a motion image measuring apparatus which measures movement of an object by processing a sequence of motion images of the object, the method comprising the steps of:

capturing the sequence of motion images of said object in an image pick-up camera, said sequence of motion images having a plurality of brightness patterns;

applying the plurality of brightness patterns to a spatiotemporal filtering differentiator having a plurality of differing initial phases to obtain local differential values grouped by the plurality of differing initial phases;

calculating local brightness gradients based on the local differential values; and providing a measurement of movement of said object based on the local brightness gradients.

2. The method as claimed in claim 1, wherein:

the plurality of brightness patterns comprise a sequence of planer patterns; and the plurality of differing initial phases are two in number and different from each other by approximately $\pi/2$ radians.

3. The method as claimed in claim 1, wherein the calculating step comprises the steps of:

collecting the local differential values grouped by the plurality of differing initial phases to obtain combined local differential values; and analyzing the combined local differential values to obtain the local brightness gradients.

4. The method as claimed in claim 1, wherein:

the calculating step comprises rendering relatively large local differential values of the local differential values larger, and rendering relatively small local differential values of the local differential values smaller.

5. The method as claimed in claim 1, wherein:

the calculating step comprises providing those of the local differential values which are larger than a first predetermined value with a tendency to approach a relatively high value and those of the local differential values which are smaller than a second predetermined value with a tendency to approach a relatively small value.

6. The method as claimed in claim 1, wherein:

the calculating step comprises selecting relatively small local differential values from the local differential values.

7. The method as claimed in claim 1, wherein:

the calculating step comprises selecting relatively large local differential values from the local differential values.

8. The method as claimed in claim 1, wherein:

the plurality of brightness patterns comprise geometric real local areas and local measures of brightness respectively associated with the geometric real local areas; and wherein the applying step comprises:

a first step comprising substeps (a) through (e) wherein substeps (a) and (b) occur separate from substeps c) through (e), substeps (a) through (e) being defined as follows:

(a) spatiotemporally filtering the geometric real local areas to obtain first local contrasty areas; and (b) executing a first convolution of the local measures of brightness to the first local contrasty areas to obtain local brightness values;

(c) spatially filtering the geometric real local areas to obtain second local contrasty areas, (d) executing a temporal difference calculation of the second local contrasty areas to obtain local area differences; and (e) executing a second convolution of the local measures of brightness to the local area differences to obtain local brightness differences; and a second step of dividing the local brightness differences by the local brightness values to obtain the local differential values.

9. The method as claimed in claim 8, wherein:

the spatiotemporally filtering of substep (a) comprises processing a set of spatiotemporal coordinates of the geometric real local areas through a multi-variable Gabor function to obtain the first local contrasty areas as spatiotemporally anisotropic spatiotemporal coordinates.

10. The method as claimed in claim 8, wherein:

the substep (d) comprises processing spatiotemporal coordinates of the geometric real local areas through a combination of a multi-variable Gabor function and a temporal-difference calculating operator, to obtain the local area differences as spatially anisotropic spatiotemporal coordinates.

11. An image processing system in a motion image measuring apparatus which measures movement of an object by processing a sequence of motion images of the object, said sequence of motion images being captured by an image pick-up camera and said sequence of motion images having a plurality of brightness patterns, the system comprising:

spatiotemporal filtering differentiator means for filtering and differentiating the plurality of brightness patterns, the spatiotemporal filtering differentiator means having a plurality of differing initial phases for obtaining a set of local differential values grouped by the plurality of differing initial phases;

calculating means for calculating local brightness gradients based on the local differential values; and measuring means for providing a measurement of movement of said object in accordance with the local brightness gradients.

12. The system as claimed in claim 11, wherein:

the plurality of brightness patterns comprise a sequence of planer patterns; and the plurality of differing initial phases are two in number and different from each other by approximately $\pi/2$ radians.

13. The system as claimed in claim 11, wherein the calculating means comprises:

a collector means for collecting the local differential values grouped by the plurality of differing initial phases to obtain combined local differential values; and an analysis means for analyzing the combined local differential values to obtain the local brightness gradients.

14. The system as claimed in claim 11, wherein:

the calculating means comprises rendering means for rendering relatively large local differential values of the local differential values larger, and rendering relatively small local differential values of the local differential values smaller.

15. The system as claimed in claim 11, wherein:

the calculating means comprises providing means for providing those of the local differential values which are larger than a first predetermined value with a tendency to approach a relatively high value and those of the local differential values smaller than a second predetermined value with a tendency to approach a relatively small value.

16. The system as claimed in claim 11, wherein:
the calculating means comprises selecting means for selecting relatively small local differential values from the local differential values.

17. The system as claimed in claim 11, wherein:
the calculating means comprises selecting means for selecting relatively large local differential values from the local differential values.

18. The system as claimed in claim 11, wherein:
the plurality of brightness patterns comprise geometric real local areas and local measures of brightness respectively associated with the geometric real local areas; and
wherein the spatiotemporal filtering differentiator means comprises:
spatiotemporal filter means for spatiotemporally filtering the geometric real local areas to obtain first local contrasty areas;
first convolution means for executing a first convolution of the local measures of brightness to the first local contrasty area to obtain local brightness values;
spatially filtering calculation means for spatially filtering the geometric real local areas to obtain second local contrasty areas and for executing a temporal difference calculation of the second local contrasty areas to obtain local area differences;
second convolution means for executing a second convolution of the local measures of brightness to the local area differences to obtain local brightness differences; and
divider means for dividing the local brightness differences by the local brightness values to obtain the local differential values.

19. The system as claimed in claim 18, wherein:
the spatiotemporal filter means comprises a multi-variable Gabor function means for processing spatiotemporal coordinates of the geometric real local areas to obtain the first local contrasty areas as spatiotemporally anisotropic spatiotemporal coordinates.

20. The system as claimed in claim 18, wherein:
the spatially filtering calculation means comprises a multi-variable Gabor function means and a temporal-difference calculating operator means for processing spatiotemporal coordinates of the geometric real local areas to obtain the local area differences as spatially anisotropic spatiotemporal coordinates.

21. An image processing method in a motion image measuring apparatus which measures movement of an object by processing a temporal sequence of motion images of the object in order to determine an optical flow in terms of a brightness gradient at a spatiotemporal local region in a frame of the temporal sequence of motion images, each of said motion images comprising an original brightness pattern, the original brightness pattern comprising:
geometric real local areas wherein each geometric real local area is defined in a real space in a spatiotemporal frame,
local measures of brightness wherein each local measure of brightness is associated with one of the geometric real local areas, and
noise components wherein each noise component is associated with one of the geometric real local areas,
the method comprising the steps of:
an initial step of capturing the temporal sequence of motion images of said object in an image pick-up camera;
a first step comprising substeps (a) through (j), wherein substeps (a) through (d) occur separate from, substeps (e) through (j), substeps (a) through (j) being defined as follows:

(a) removing the noise component associated with each geometric real local area of a current motion image from the temporal sequence of motion images, by filtering the geometric real local area through a plurality of anisotropic spatiotemporal filters, wherein each the anisotropic spatiotemporal filters has a plurality of parameters, and wherein one of the parameters is an initial phase shifting parameter;
(b) obtaining, for each geometric real local area, a plurality of first contrasty local areas, each of the plurality of first contrasty local areas being identifiable by the parameters corresponding to one of the plurality of anisotropic spatiotemporal filters;
(c) executing a convolution of the local measure of brightness associated with each geometric real local area to the first contrasty local areas; and
(d) obtaining a plurality of identifiable local brightness estimates from the convolution of substep (c);
(e) removing the noise component associated with each geometric real local area of a current image from said temporal sequence of motion images by filtering the geometric real local areas through a plurality of anisotropic spatial filters, said plurality of anisotropic spatial filters having a plurality of parameters in a one-to-one correspondence to the plurality of parameters of the anisotropic spatiotemporal filters;
(f) obtaining a plurality of second contrasty local areas, each second contrasty local area being identifiable by the parameters corresponding to one of the anisotropic spatial filters; and
(g) determining a difference between each second contrasty local area and a corresponding second contrasty local area of a neighboring motion image in the temporal sequence of motion images;
(h) obtaining a plurality of geometric local differences;
(i) executing a convolution of a local measure of brightness associated with each geometric real local area to the geometric local differences; and
(j) obtaining a plurality of identifiable local difference estimates of brightness from the convolution of substep (i);
a second step comprising the substeps of:
determining a ratio of each identifiable local difference estimate to a corresponding one of the identifiable local brightness estimates;
obtaining for each of the phase shifting parameters a plurality of first local brightness differential values;
determining a total sum of the local brightness differential values from all of the phase shifting parameters; and
obtaining for each parameter a plurality of second local brightness differential values;
a third step comprising the substeps of:
determining a local brightness gradient for each geometric real local area in the temporal sequence of motion images; and
storing the local brightness gradient in an accessible manner; and
a fourth step comprising the substeps of:
reading the local brightness gradient of each of the geometric real local areas in a spatiotemporal vicinity of the local region; and
calculating the brightness gradient at the spatiotemporal local region based on the local brightness gradients read.

* * * * *